United States Patent [19]
Takeuchi et al.

[11] Patent Number: 5,584,540
[45] Date of Patent: Dec. 17, 1996

[54] HYDRAULIC BRAKING SYSTEM FOR AN AUTOMOTIVE VEHICLE

[75] Inventors: Hiroaki Takeuchi, Toyota; Masashi Sawada, Chiryu, both of Japan

[73] Assignee: Aisin Seiki Kabushiki Kaisha, Kariya, Japan

[21] Appl. No.: 507,014

[22] Filed: Jul. 25, 1995

[30] Foreign Application Priority Data

Jul. 25, 1994 [JP] Japan .................... 6-172819

[51] Int. Cl.$^6$ .................... B60T 8/46
[52] U.S. Cl. .................... 303/116.1; 303/900; 303/187
[58] Field of Search .................... 303/139, 140, 303/143, 144, 187, 113.2, 116.1, 119.1, 900

[56] References Cited

U.S. PATENT DOCUMENTS

| | | | |
|---|---|---|---|
| 4,971,400 | 11/1990 | Jonner | 303/139 X |
| 5,152,586 | 10/1992 | Burgdorf | 303/113.2 |
| 5,441,336 | 8/1995 | Takeuchi | 303/116.1 |

FOREIGN PATENT DOCUMENTS

| | | | |
|---|---|---|---|
| 1-195167 | 8/1989 | Japan | 303/139 |
| 6-171487 | 6/1994 | Japan . | |
| 7-108918 | 4/1995 | Japan . | |

*Primary Examiner*—Lee W. Young
*Attorney, Agent, or Firm*—Burns, Doane, Swecker & Mathis, LLP

[57] ABSTRACT

A hydraulic braking system for an automobile vehicle includes a first brake pressure control circuit and a second brake pressure control circuit, each of which includes a front solenoid valve disposed between one of the front wheel brakes and one of pressure chambers of a tandem master cylinder, a rear solenoid valve disposed between one of the rear wheel brakes and the pressure chamber, a hydraulic pump whose outlet communicates with a conduit located between the solenoid valves and the pressure chamber, a change over valve disposed between the solenoid valves and the pressure chamber, the change over valve being positionable in a first position which connects the solenoid valves to the pressure chamber and a second position which connects the inlet of the hydraulic pump to the pressure chamber, a front orifice disposed between the front wheel brake and the inlet of the hydraulic pump, a rear orifice disposed between the rear wheel brake and the inlet of the hydraulic pump, and a check valve disposed between the rear wheel brake and the inlet of the hydraulic pump for preventing brake fluid from flowing into the rear wheel brake.

8 Claims, 1 Drawing Sheet

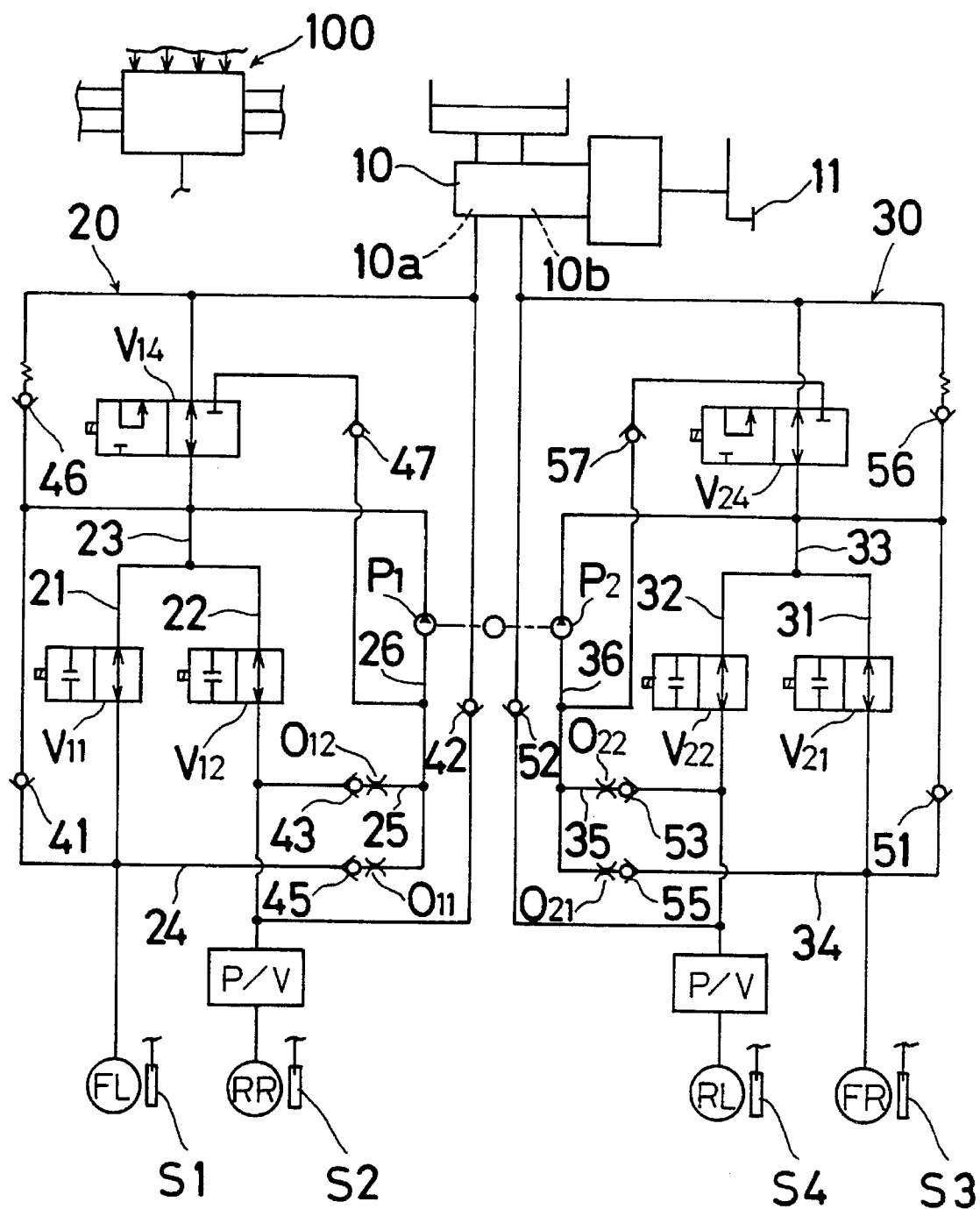
Fig.

HYDRAULIC BRAKING SYSTEM FOR AN AUTOMOTIVE VEHICLE

FIELD OF THE INVENTION

This invention relates to a hydraulic braking system for an automobile vehicle. More particularly, the invention pertains to a brake pressure control device used in such a system for preventing the vehicle wheels from being locked (anti-lock control) when the wheels are braked and for preventing the vehicle wheels from slipping (traction control) when the wheels are driven.

BACKGROUND OF THE INVENTION

A known type of hydraulic braking system for an automobile vehicle is disclosed in Japanese Patent Laid Open No. 6(1994)-171487. The hydraulic braking system includes a first brake circuit and a second brake circuit. The first brake circuit connects the front wheel brake installed on one of the front wheels and the rear wheel brake installed on one of the rear wheels to one of the pressure chambers of a tandem master cylinder. The second brake circuit connects the other front wheel brake and the other rear wheel brake to the other pressure chamber of the tandem master cylinder (diagonal brake circuit).

Each of the brake circuits includes a first solenoid valve and a second solenoid valve (both of which are of the normally open type) which are each installed in a brake conduit connecting one of the wheel brakes to one of the pressure chambers of the tandem master cylinder.

Each of the brake circuits further includes a hydraulic pump driven by an electric motor. An outlet port of each pump communicates with one of the brake conduits connecting one of the solenoid valves to the respective pressure chamber of the tandem master cylinder. Each of the brake circuits further includes orifices which are each installed in a brake conduit connecting one of the wheel brakes to an inlet port of the hydraulic pump.

In accordance with the above described system, the brake pressures in the wheel brakes can be controlled so as to prevent the four wheels from being locked when the wheels are braked (anti-lock control). The hydraulic braking system is also relatively simple in structure so as to be easily manufactured with relatively low cost.

However, the above hydraulic braking system for an automobile vehicle cannot control the brake pressure in the wheel brakes in order to prevent the driven wheels from slipping when the wheels are driven (i.e., the system cannot effect traction control).

SUMMARY OF THE PRESENT INVENTION

A need exists, therefore, for a hydraulic braking system for an automobile vehicle which can control the brake pressure of the wheel brakes to prevent the four wheels from being locked when the wheels are braked.

A need also exists for a hydraulic braking system for an automobile vehicle which can control the brake pressure of the wheel brakes to prevent the driven wheels from slipping when the wheels are driven.

It would also be desirable to provide a hydraulic braking system for an automobile vehicle which can be applied to a diagonal brake circuit.

It would also be quite desirable to provide a hydraulic braking system for an automobile vehicle which is durable, simple in construction and relatively small in size.

It would be further desirable to provide a hydraulic braking system for an automobile vehicle which is low in cost.

SUMMARY OF THE INVENTION

To address the foregoing, the hydraulic braking system for an automobile vehicle in accordance with the present invention comprises a tandem master cylinder including a first pressure chamber and a second pressure chamber, a first primary conduit connecting a first wheel brake installed on one of driven wheels and a second wheel brake installed on one of non-driven wheels to the first pressure chamber of the tandem master cylinder, a first solenoid valve installed in the first primary conduit so as to be disposed between the first wheel brake and the first pressure chamber, and a second solenoid valve installed in the first primary conduit so as to be disposed between the second wheel brake and the first pressure chamber. A first hydraulic pump has an outlet that communicates with a first junction portion of the first primary conduit located between the first and second solenoid valves and the first pressure chamber, and an inlet that communicates with the first wheel brake through a first relief conduit and with the second wheel brake through a second relief conduit. A first change over valve is installed in the first primary conduit so as to be located between the first junction portion and the first pressure chamber, the first change over valve being positionable in a first position in which the first and second solenoid valves are connected to the first pressure chamber and the inlet of the first hydraulic pump is disconnected from the first pressure chamber, and a second position in which the inlet of the first hydraulic pump is connected to the first pressure chamber and the first and second solenoid valves are connected to the first pressure chamber by way of the first hydraulic pump. A first orifice is disposed in the first relief conduit, a second orifice is disposed in the second relief conduit, and a first check valve is disposed in the second relief conduit and prevents brake fluid from flowing into the second wheel brake. A second primary conduit connects a third wheel brake installed in the other driven wheel and a fourth wheel brake installed in the other non-driven wheel to the second pressure chamber of the tandem master cylinder, a third solenoid valve is installed in the second primary conduit to be disposed between the third wheel brake and the second pressure chamber, and a fourth solenoid valve is installed on the second primary conduit to be disposed between the fourth wheel brake and the second pressure chamber. A second hydraulic pump has an outlet that communicates with a second junction portion of the second primary conduit located between the third and fourth solenoid valves and the second pressure chamber, and an inlet that communicates with the third wheel brake through a third relief conduit and with the fourth wheel brake through a fourth relief conduit. A second change over valve is installed on the second primary conduit to be located between the second junction portion and the second pressure chamber, the second changeover valve being positionable in a first position which connects the third and fourth solenoid valves to the second pressure chamber and disconnects the inlet of the second hydraulic pump from the second pressure chamber, and a second position which connects the inlet of the second hydraulic pump to the second pressure chamber and connects the third and fourth solenoid valves to the second pressure chamber by way of the second hydraulic pump. A third orifice is disposed in the third relief conduit, a fourth orifice is disposed in the fourth relief conduit and a second check valve is disposed in the fourth relief conduit to prevent the brake fluid from flowing into the fourth wheel brake.

BRIEF DESCRIPTION OF THE DRAWING FIGURE

The features and advantages associated with the hydraulic vehicle braking system according to the present invention will be more clearly appreciated from the following description considered in conjunction with the accompanying drawing figure which is a circuit diagram of the hydraulic braking system for an automobile vehicle of the present invention.

DETAILED DESCRIPTION OF PREFERRED EMBODIMENT OF THE INVENTION

With reference to the drawing FIGURE, a tandem master cylinder 10 with a brake booster is operated by a brake pedal 11. A front left wheel brake FL installed on the front left wheel driven by the engine of the vehicle (not shown in FIGURE) and a rear right wheel brake RR installed on the rear right wheel not driven by the engine are connected to a first pressure chamber 10a of the tandem master cylinder 10 through a first brake pressure control circuit 20.

A front right wheel brake FR installed on the front right wheel driven by the engine and a rear left wheel brake RL installed on the rear left wheel not driven by the engine are connected to a second pressure chamber 10b of the tandem master cylinder 10 through a second brake pressure control circuit 30.

The brake pressure control circuits 20, 30 include normally open type solenoid valves V11, V12, V21, V22 disposed in pressure conduits 21, 22, 31, 32 respectively. A pair of hydraulic pumps P1, P2 is also provided, with the pumps P1, P2 being simultaneously driven by an electric motor M. The hydraulic pumps P1, P2 each include respective outlets that communicate with conduits 23, 33 which connect the solenoid valves V11, V12, V21, V22 to the pressure chambers 10a, 10b of the master cylinder 10. Individual respective orifices O11, O12, O21, O22 are disposed in conduits 24, 25, 34, 35 which connect the inlets of the hydraulic pumps P1, P2 to the wheel brakes FL, RR, FR, RL respectively. Check valves 41, 42, 51, 52 are arranged in parallel with the solenoid valves V11, V12, V21, V22 to rapidly return brake fluid to the master cylinder 10. Conventional proportioning valves P/V are disposed between the solenoid valves V12, V22 and the wheel brakes RR, RL respectively.

The first brake pressure control circuit 20 includes a change over valve V14 disposed in the conduit 23 located or extending between the first pressure chamber 10a and a first junction portion of the conduit 23 and a conduit connected to the outlet of the hydraulic pump P1. The first brake pressure control circuit 20 also includes check valves 43, 45 disposed in the conduits 25, 24 respectively to prevent the brake fluid from flowing into the wheel brakes RR, FL. The first brake pressure control circuit 20 further includes a relief valve 46 disposed in a first bypass conduit connecting the outlet of the hydraulic pump P1 to the first pressure chamber 10a of the tandem master cylinder 10 in order to relieve the surplus brake fluid pumped out by the hydraulic pump P1 to the master cylinder 10. A check valve 47 is disposed in a first return conduit connecting the inlet of the hydraulic pump P1 and the first change over valve V14.

The second brake pressure control circuit 30 includes a second change over valve V24 disposed in the conduit 33 located or extending between the second pressure chamber 10b and a second junction portion of the conduit 33 and a conduit connected to the outlet of the hydraulic pump P2. The second brake pressure control circuit 30 also includes check valves 53, 55 disposed in the conduits 35, 34 respectively to prevent the brake fluid from flowing into the wheel brakes RL, FR. The second brake pressure control circuit 30 further includes a relief valve 56 disposed in a second bypass conduit connecting the outlet of the hydraulic pump P2 to the second pressure chamber 10b of the tandem master cylinder 10 to relieve the surplus brake fluid pumped out by the hydraulic pump P2 to the master cylinder 10. A check valve 57 is disposed in a second return conduit that connects the inlet of the hydraulic pump P2 and the second change over valve V24.

Each of the change over valves V14, V24 is a 3-port, 2-position type solenoid valve. The change over valves V14, V24 connect the pressure chambers 10a, 10b to the respective solenoid valves V11, V12, V21, V22 and disconnect the pressure chambers 10a, 10b from the inlets of the respective hydraulic pumps P1, P2 as shown in the drawing figure when the change over valves V14, V24 are not operated. On the other hand, when the change over valves V14, V24 are operated, the change over valves V14, V24 connect the pressure chambers 10a, 10b to the inlets of the respective hydraulic pumps P1, P2 so that the pressure chambers 10a, 10b are connected to the solenoid valves V11, V12, V21, V22 by way of the pumps P1, P2.

A controller 100 is connected to the solenoid valves V11, V12, V21, V22, V14, V24, the hydraulic pumps P1, P2 and wheel speed sensors S1, S2, S3, S4 mounted on the wheels in order to operate the solenoid valves V11, V12, V21, V22, V14, V24 and the hydraulic pumps P1, P2 depending on the slip rates of the wheels calculated by the controller 100 based on signals from the wheel speed sensors S1, S2, S3, S4.

The operation of the hydraulic braking system for an automobile vehicle of the present invention will be described hereinafter. When the brake pedal 11 is operated, the master cylinder 10 generates brake pressure in the pressure chambers 10a, 10b. The brake pressure in the pressure chambers 10a, 10b is transmitted to the wheel brakes FL, RR, FR, RL through the brake pressure control circuits 20, 30. At this time, the hydraulic pumps P1, P2 are operated and the solenoid valves V11, V12, V21, V22, V14, V24 are independently operated depending upon the conditions of the wheels in order to modulate the brake pressure in the wheel brakes FL, RR, FR, RL.

When the change over valves V14, V24 are not operated, the operation of the hydraulic vehicle braking system is somewhat similar to that of the hydraulic braking system disclosed in Japanese Patent Laid Open No. 6-171487. When each of the solenoid valves V11, V12, V21, V22 is closed and the hydraulic pumps P1, P2 are driven, the brake fluid in the corresponding wheel brakes FL, RR, FR, RL flows out through the check valves 45, 43, 55, 53 and the orifices O11, O12, O21, O22 to decrease the brake pressures in the wheel brakes FL, RR, FR, RL.

When each of the solenoid valves V11, V12, V21, V22 is opened, the brake fluid flows into the corresponding wheel brakes FL, RR, FR, RL to increase the brake pressures in the wheel brakes FL, RR, FR, RL since the amount of the brake fluid flowing into the wheel brakes FL, RR, FR, RL from the master cylinder 10 is larger than that of the brake fluid flowing out from the wheel brakes FL, RR, FR, RL through the orifices O11, O12, O21, O22. In accordance with the above operation, the wheels are prevented from being locked.

When the brake pedal 11 is released, the brake pressure in the pressure chambers 10a, 10b of the tandem master cylinder 10 is decreased. At the same time, the solenoid valves V11, V12, V21, V22 are opened and the driving operation of the hydraulic pumps P1, P2 is stopped by the controller 100. Thus, the brake fluid is returned to the pressure chambers 10a, 10b of the master cylinder 10 from the wheel brakes FL, RR, FR, RL to thereby release the braking forces on the wheels.

When the controller 100 determines the existence of slip conditions in the front driven wheels because of the application of an excess driving force to the wheels by the engine depending on the slip rates of the wheels calculated by the controller 100 and based on signals from the wheel speed sensors S1, S2, S3 and S4, the controller 100 operates the change over valves V14, V24 and the hydraulic pumps P1, P2, and closes the solenoid valves V12, V22 corresponding to the non-driven wheels. The controller 100 further repeatedly opens and closes the solenoid valves V11, V21 corresponding to the driven wheels to control the brake pressure in the wheel brakes FL, FR.

In accordance with the above operation, each of the hydraulic pumps P1, P2 sucks the brake fluid in the pressure chambers 10a, 10b of the tandem master cylinder 10 through the change over valves V14, V24. The hydraulic pumps P1, P2 further pump out the brake fluid to the wheel brakes FL, FR through the solenoid valves V11, V21 in order to apply the brake force to the front driven wheel.

Since a portion of the brake fluid pumped into the wheel brakes FL, FR is returned to the hydraulic pumps P1, P2 through the orifices O11, O21, the brake pressure is applied to the rear wheel brakes RR, RL, and is equal to the pressure difference between the front and the rear of each of the orifices O11, O21 (i.e., the pressure differential across the orifices O11, O21). The check valves 43, 53 installed in the conduits 25, 35 prevent the brake pressure in the conduits 25, 35 from being applied to the rear wheel brakes RR, RL.

When the controller 100 determines a decrease in the slip rates of the wheels based on the signals from the wheel speed sensors S1, S2, S3, S4, the controller 100 closes the solenoid valves V11, V21. The brake fluid in the wheel brakes FL, FR flows out through the check valves 45, 55 and the orifices O11, O21 by operation of the hydraulic pumps P1, P2 to decrease the brake pressures in the brake wheels FL, FR.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic braking system for an automobile vehicle having a pair of driven wheels and a pair of non-driven wheels, comprising:

a tandem master cylinder having a first pressure chamber and a second pressure chamber;

a first primary conduit for connecting the first pressure chamber to a first wheel brake installed on one of the driven wheels and a second wheel brake installed on one of the non-driven wheels;

a first solenoid valve installed in the first primary conduit for being disposed between the first wheel brake and the first pressure chamber;

a second solenoid valve installed in the first primary conduit for being disposed between the second wheel brake and the first pressure chamber;

a first hydraulic pump having an outlet that communicates with a first junction portion of the first primary conduit located between the first and second solenoid valves and the first pressure chamber, and an inlet for communicating with the first wheel brake through a first relief conduit and for communicating with the second wheel brake through a second relief conduit;

a first change over valve disposed in the first primary conduit between the first junction portion and the first pressure chamber, the first change over valve being positionable in a first position in which the first and second solenoid valves are connected to the first pressure chamber and the inlet of the first hydraulic pump is disconnected from the first pressure chamber, and a second position in which the inlet of the first hydraulic pump is connected to the first pressure chamber and the first and second solenoid valves are connected to the first pressure chamber by way of the first hydraulic pump;

a first orifice disposed in the first relief conduit;

a second orifice disposed in the second relief conduit;

a first check valve disposed in the second relief conduit for preventing brake fluid from flowing into the second wheel brake;

a second primary conduit for connecting the second pressure chamber of the tandem master cylinder to a third wheel brake installed on the other driven wheel and a fourth wheel brake installed on the other non-driven wheel;

a third solenoid valve installed in the second primary conduit for being disposed between the third wheel brake and the second pressure chamber;

a fourth solenoid valve installed in the second primary conduit for being disposed between the fourth wheel brake and the second pressure chamber;

a second hydraulic pump having an outlet that communicates with a second junction portion of the second primary conduit located between the third and fourth solenoid valves and the second pressure chamber, and an inlet for communicating with the third wheel brake through a third relief conduit and with the fourth wheel brake through a fourth relief conduit;

a second change over valve installed in the second primary conduit between the second junction portion and the second pressure chamber, the second change over valve being positionable in a first position in which the third and fourth solenoid valves are connected to the second pressure chamber and the inlet of the second hydraulic pump is disconnected from the second pressure chamber, and a second position in which the inlet of the second hydraulic pump is connected to the second pressure chamber and the third and fourth solenoid valves are connected to the second pressure chamber by way of the second hydraulic pump;

a third orifice disposed in the third relief conduit;

a fourth orifice disposed in the fourth relief conduit; and a second check valve disposed in the fourth relief conduit for preventing the brake fluid from flowing into the fourth wheel brake.

2. A hydraulic braking system for an automobile vehicle having a pair of driven wheels and a pair of non-driven wheels, comprising:

a tandem master cylinder including a first pressure chamber and a second pressure chamber;

a first primary conduit for connecting the first pressure chamber to a first front wheel brake installed on one of front driven wheels and a first rear wheel brake installed on one of rear non-driven wheels;

a first from solenoid valve installed in the first primary conduit for being disposed between the first front wheel brake and the first pressure chamber;

a first rear solenoid valve installed in the first primary conduit for being disposed between the first rear wheel brake and the first pressure chamber;

a first hydraulic pump having an outlet that communicates with a first junction portion of the first primary conduit located between the first solenoid valves and the first pressure chamber, and an inlet for communicating with the first front wheel brake through a first front relief conduit and with the first rear wheel brake through a first rear relief conduit;

a first change over valve installed in the first primary conduit to be located between the first junction portion and the first pressure chamber, the first change over valve being adapted to be positioned in a first position in which the first solenoid valve is connected to the first pressure chamber and the inlet of the first hydraulic pump is disconnected from the first pressure chamber, and a second position in which the inlet of the first hydraulic pump is connected to the first pressure chamber and the first solenoid valve is connected to the first pressure chamber by way of the first hydraulic pump;

a first front orifice disposed in the first front relief conduit;

a first rear orifice disposed in the first rear relief conduit;

a first rear check valve disposed in the first rear relief conduit for preventing brake fluid from flowing into the first rear wheel brake;

a second primary conduit for connecting a second front wheel brake installed on the other from driven wheel and a second rear wheel brake installed on the other rear non-driven wheel to the second pressure chamber of the tandem master cylinder;

a second front solenoid valve installed in the second primary conduit for being disposed between the second front wheel brake and the second pressure chamber;

a second rear solenoid valve installed in the second primary conduit for being disposed between the second rear wheel brake and the second pressure chamber;

a second hydraulic pump having an outlet that communicates with a second junction portion of the second primary conduit located between the second solenoid valve and the second pressure chamber, and an inlet for communicating with the second front wheel brake through a second front relief conduit and with the second rear wheel brake through a second rear relief conduit;

a second change over valve installed in the second primary conduit between the second junction portion and the second pressure chamber, the second change over valve being positionable in a first position to connect the second solenoid valve to the second pressure chamber and disconnect the inlet of the second hydraulic pump from the second pressure chamber, and a second position to connect the inlet of the second hydraulic pump to the second pressure chamber and connect the second solenoid valve to the second pressure chamber by way of the second hydraulic pump;

a second from orifice disposed in the second from relief conduit;

a second rear orifice disposed in the second rear relief conduit; and a second rear check valve disposed in the second rear relief conduit for preventing the brake fluid from flowing into the second rear wheel brake.

3. A hydraulic braking system for an automobile vehicle as recited in claim 2, further comprising a first front check valve disposed in the first front relief conduit for preventing brake fluid from flowing into the first front wheel brake, and a second front check valve disposed in the second front relief conduit for preventing brake fluid from flowing into the second front wheel brake.

4. A hydraulic braking system for an automobile vehicle having a pair of driven wheels and a pair of non-driven wheels, comprising:

a tandem master cylinder having a first pressure chamber and a second pressure chamber;

a first primary conduit for connecting the first pressure chamber to a first wheel brake installed on a first one of the driven wheels and a second wheel brake installed on a first one of the non-driven wheels;

a first solenoid valve installed in the first primary conduit between the first wheel brake and the first pressure chamber for being moved between a first position in which brake fluid is supplied from the first pressure chamber to the first wheel brake and a second position in which brake fluid is prevented from being supplied to the first wheel brake from the first pressure chamber;

a second solenoid valve installed in the first primary conduit between the second wheel brake and the first pressure chamber for being moved between a first position in which brake fluid is supplied from the first pressure chamber to the second wheel brake and a second position in which brake fluid is prevented from being supplied to the second wheel brake from the first pressure chamber;

a first hydraulic pump having an outlet that communicates with a first junction portion of the first primary conduit located between the first and second solenoid valves and the first pressure chamber, and an inlet for communicating with the first wheel brake through a first relief conduit and for communicating with the second wheel brake through a second relief conduit;

a first change over valve disposed in the first primary conduit between the first junction portion and the first pressure chamber, the first change over valve being positionable in a first position in which the first and second solenoid valves are connected to the first pressure chamber and the inlet of the first hydraulic pump is disconnected from the first pressure chamber, and a second position in which the inlet of the first hydraulic pump is connected to the first pressure chamber and the first and second solenoid valves are connected to the first pressure chamber by way of the first hydraulic pump;

a first wheel speed sensor for being mounted on the first one of the driven wheels;

a first orifice disposed in the first relief conduit;

a second orifice disposed in the second relief conduit;

a first check valve disposed in the second relief conduit for preventing brake fluid from flowing into the second wheel brake;

a controller connected to the first wheel speed sensor, the first and second solenoid valves, the first hydraulic pump and the first change over valve so that upon detection of a slip condition in the first one of the driven wheels the controller positions the second solenoid valve in the second position, positions the change over valve in the second position, operates the first hydraulic pump and repeatedly moves the first solenoid valve between the first and second positions.

5. A hydraulic braking system for an automobile vehicle as recited in claim 4, further comprising a second primary conduit for connecting the second pressure chamber of the tandem master cylinder to a third wheel brake installed in the other driven wheel and a fourth wheel brake installed on the other non-driven wheel, a third solenoid valve installed in the second primary conduit between the third wheel brake and the second pressure chamber, and a fourth solenoid valve installed in the second primary conduit between the fourth wheel brake and the second pressure chamber.

6. A hydraulic braking system for an automobile vehicle as recited in claim 5, further comprising a second hydraulic pump having an outlet that communicates with a second junction portion of the second primary conduit located between the third and fourth solenoid valves and the second pressure chamber, and an inlet for communicating with the third wheel brake through a third relief conduit and with the fourth wheel brake through a fourth relief conduit.

7. A hydraulic braking system for an automobile vehicle as recited in claim 6, further comprising a second change over valve installed in the second primary conduit between the second junction portion and the second pressure chamber, the second change over valve being positionable in a first position in which the third and fourth solenoid valves are connected to the second pressure chamber and the inlet of the second hydraulic pump is disconnected from the second pressure chamber, and a second position in which the inlet of the second hydraulic pump is connected to the second pressure chamber and the third and fourth solenoid valves are connected to the second pressure chamber by way of the second hydraulic pump.

8. A hydraulic braking system for an automobile vehicle as recited in claim 7, further comprising a third orifice disposed in the third relief conduit, a fourth orifice disposed in the fourth relief conduit, and a second check valve disposed in the fourth relief conduit for preventing the brake fluid from flowing into the fourth wheel brake.

* * * * *